United States Patent
Felix

(10) Patent No.: US 7,112,058 B2
(45) Date of Patent: Sep. 26, 2006

(54) CLAMPING MECHANISM FOR AN INJECTION MOLDING MACHINE

(75) Inventor: Roland Felix, Eckartsberga (DE)

(73) Assignee: Demag Ergotech GmbH, Schwaig (DE)

(*) Notice: Subject to any disclaimer, the term of this patent is extended or adjusted under 35 U.S.C. 154(b) by 367 days.

(21) Appl. No.: 10/613,925

(22) Filed: Jul. 3, 2003

(65) Prior Publication Data

US 2004/0058032 A1 Mar. 25, 2004

(30) Foreign Application Priority Data

Jul. 4, 2002 (DE) .............................. 102 30 024

(51) Int. Cl.
*B29C 45/64* (2006.01)
(52) U.S. Cl. .................... 425/590; 425/595; 425/451.7
(58) Field of Classification Search ................ 425/589, 425/590, 595, 451.2, 451.7
See application file for complete search history.

(56) References Cited

U.S. PATENT DOCUMENTS 3,191,235 A * 6/1965 Rougement .............. 425/451.7
3,604,058 A * 9/1971 Fischbach ................... 425/150
3,704,973 A * 12/1972 Renfrew et al. .......... 425/451.7
4,984,980 A * 1/1991 Ueno ......................... 425/595
2004/0091570 A1* 5/2004 Wohlrab et al. ............ 425/595

FOREIGN PATENT DOCUMENTS

DE 101 03 983 C1 4/2002

* cited by examiner

*Primary Examiner*—James P. Mackey
(74) *Attorney, Agent, or Firm*—Henry M. Feiereisen

(57) ABSTRACT

A clamping mechanism for a clamping unit of an injection molding machine includes a drive unit which moves a first platen linearly relative to a fixed second platen and is linked to the first platen for limited movement. A force-application unit builds up a clamping force, when the first platen assumes a closing position. Disposed between the force application unit and the first platen is a locking device which transmits the clamping force and includes a screw mechanism which operates in synchronism with the drive unit and has a screw shaft and a locking nut constructed to normally connect with clearance to the screw shaft via a thread connection and to interact with the screw shaft for transmitting a load, when the clamping force is applied, whereby the threaded connection is forced to self-lock to secure the locking nut on the screw shaft and prevent reverse rotation of the locking nut.

12 Claims, 4 Drawing Sheets

CLAMPING MECHANISM FOR AN INJECTION MOLDING MACHINE

CROSS-REFERENCES TO RELATED APPLICATIONS

This application claims the priority of German Patent Application, Ser. No. 102 30 024.0-16, filed Jul. 4, 2002, pursuant to 35 U.S.C. 119(a)–(d), the disclosure of which is incorporated herein by reference.

BACKGROUND OF THE INVENTION

The present invention relates to a clamping mechanism for a clamping unit of an injection molding machine.

German Pat. No. DE 101 03 983 C1 discloses a clamping mechanism in the form of a screw mechanism including a ball nut for implementing the closing and opening motions of the moving platen, and a locking nut disposed on a common screw shaft. The ball nut and the locking nut are resiliently kept at a distance so that the locking nut engages with play in the threads of the screw shaft, when the platen moves. In other words, the locking nut moves contactless. When the platen is in closing position, the ball nut is shifted in axial direction to such an extent in opposition of a spring force under the action of a clamping force, applied by a clamping force cylinder via the screw shaft, that the threads between the locking nut and the screw shaft come into contact. Subsequently, the locking nut is pressed axially against the moving platen in opposition to a further spring assembly so that the brake gap of a friction brake, disposed between platen and locking nut, is closed. As a result of the thus realized rotationally fixed engagement of the locking nut upon the platen, the screw mechanism is locked and the clamping force bypasses the ball nut and is transmitted via the threaded connection between screw shaft and locking nut to the moving platen.

Although such a clamping mechanism affords an overload protection for the ball nut of a combined drive and locking mechanism, the locking nut can be restrained against rotation only in a very complicated manner. Moreover, the spring assembly is also complicated as it requires the arrangement of several, individual springs with different spring constant to respond successively.

It would therefore be desirable and advantageous to provide an improved clamping mechanism which obviates prior art shortcomings and is simple in construction while still maintaining an effective overload protection, and in particular is characterized by the absence of selectively engageable friction elements or form-fitting elements between locking nut and platen for securing the screw mechanism against reverse rotation.

SUMMARY OF THE INVENTION

According to one aspect of the present invention, a clamping mechanism for a clamping unit of an injection molding machine includes a drive unit for moving a first platen in linear direction in relation to a fixed second platen, with drive unit so linked to the first platen as to be able to carry out a limited movement, a force-application unit for building up a clamping force, when the first platen assumes a closing position, and a locking device, disposed between the force application unit and the first platen, for transmitting the clamping force, wherein the locking device includes a screw mechanism operating in synchronism with the drive unit and having a screw shaft and a locking nut constructed to normally connect with clearance to the screw shaft via a thread connection and to interact with the screw shaft for transmitting a load, when the clamping force is applied, whereby the threaded connection is forced to self-lock and to act free of clearance to thereby secure the locking nut on the screw shaft and prevent reverse rotation of the locking nut.

The present invention resolves prior art problems and omits the need for providing a separate, selectively engageable friction brake or positive engagement coupling between locking nut and moving platen, on the one hand, and a spring assembly in the form of several individual springs of different spring constant so as to act in succession, on the other hand, by using the clearance of the thread connection between locking nut and platen to construct a self-locking feature through provision of a respective thread pitch and thread friction, when a clamping force is applied, and utilizing the self-locking feature to prevent reverse rotation of the locking nut. Still, the relief of the clamping force of the drive unit is fully maintained.

Although a single screw mechanism may be used for implementing the movement of the platen and to lock the platen for maintaining the clamping force, it is, of course, also feasible to provide different power trains to realize both functions. In this case, the drive unit may be constructed not only as a screw mechanism but, as an alternative, may also be configured as a rack-and-pinion drive or hydraulic drive which is coupled in synchronism with the screw mechanism of the locking device to implement the locking function. As a consequence, it is even possible to construct the clamping mechanism completely without any springs, although the drive unit should include a spring assembly with preset spring tension, e.g., a disk spring assembly or torsionally yielding coupling, to keep the required thread clearance between locking nut and screw shaft as small as possible. Suitably, the spring tension of the spring assembly is preset in correspondence to the stroke force.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
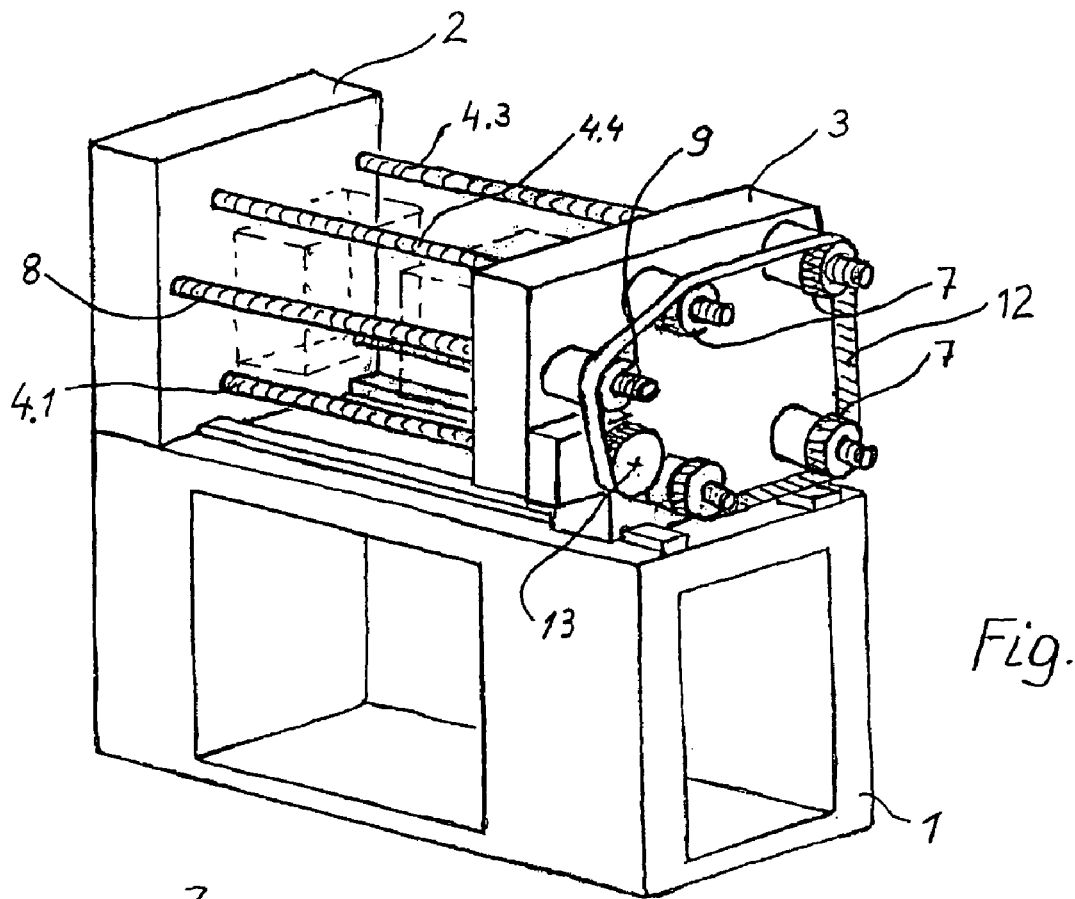
FIG. 1 is a perspective illustration of a clamping unit of an injection molding machine having incorporated therein a first embodiment of a clamping mechanism according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of a clamping unit of an injection molding machine having a machine bed 1, a fixed platen 2 mounted to the machine bed 1, and a moving platen 3, which is mounted onto the machine bed 1 for travel in a linear direction. The platens 2, 3 are interconnected by four non-rotatable tie bars 4, which extend with their ends through the fixed platen 2 and are non-rotatable but movable in axial direction by a clamping force build-up device, generally designated by reference numeral 14 in FIG. 2 and acting upon the ends of the tie bars 4. The clamping force build-up device may include hydraulic piston and cylinder units in one-to-one correspondence with the tie bars 4 on the backside of the platen 2 to apply a pulling force on the tie bars 4.

Figure 2:
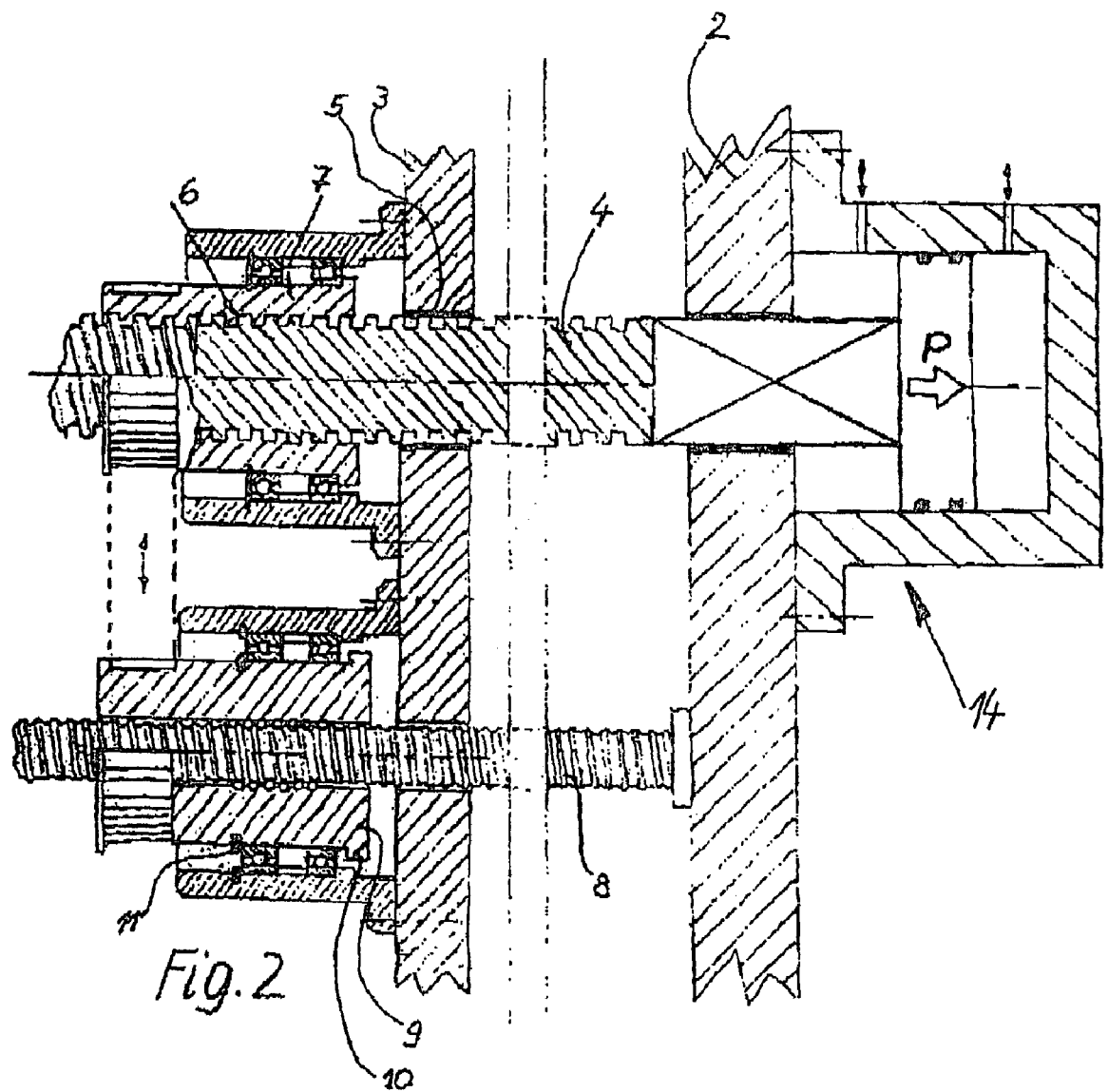
FIG. 2 is a detailed sectional view, on an enlarged scale, of the clamping mechanism of FIG. 1.

The tie bars 4 are constructed as screw shafts 4.1, 4.2, 4.3, 4.4 on the side from the moving platen 3 toward the fixed platen 2 and guided through the moving platen 3 by sliding bushes 5, as shown in FIG. 2. Meshing with the screw shafts 4.1 to 4.4 in one-to-one correspondence are locking nuts 7 via a thread connection 6 of rectangular profile. The locking nuts 7 are supported on the moving platen 3 in such a manner as to be able to rotate but being prevented from moving in axial direction.

Figure 3A:
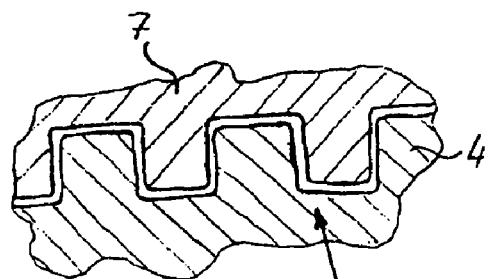
FIG. 3a is a detailed sectional view, on an even further enlarged scale, of a thread connection between a locking nut and a screw shaft of the clamping mechanism, with the locking nut and the screw shaft interlock with clearance.

In the non-limiting example of FIG. 1, the drive unit for displacement of the moving platen 3 is also constructed as a screw mechanism, including a screw shaft 8 which has one end securely attached to the fixed platen 2 and another end extending through the moving platen 3 and engaging a ball nut 9. The ball nut 9 is supported on the platen 3 so as to be able to rotate and to move to a limited extent in an axial direction between a stop shoulder 10 and a snap ring 11. The axial travel of the ball nut 9 in relation to the moving platen 3 is hereby smaller than the thread clearance of the thread connection 6. The locking nuts 7 and the ball nut 9 are operated in synchronism by an electric motor 13 via a toothed belt 12. In the absence of a clamping force upon the tie bars 4, the locking nuts 7 and the associated screw shafts 4.1 to 4.4 normally interlock with clearance, as shown in FIG. 3a, whereas the ball nut 9 runs substantially free of play on the screw shaft 8, when the electric motor 13 is operated, so as to move the platen 3, depending on the rotation direction of the electric motor 13, either toward the stop shoulder 10 in opening direction or toward the snap ring 11 in closing direction.

Figure 3B:
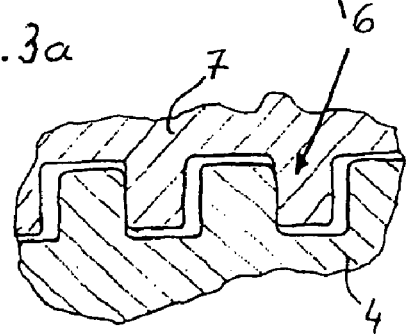
FIG. 3b is a detailed sectional view of the thread connection of FIG. 3a, with the locking nut and the screw shaft interlock with flanks in contact.

As shown by broken line in FIG. 1, when the platens 2, 3 are in closing position, the attached half-molds are moved together and the electric motor 13 is shut down. The ball nut 9 is hereby still positioned against the snap ring 11, as shown in FIG. 2, and the threaded connections 6 between the locking nuts 7 and the screw shafts 4.1.–4.4 of the tie bars 4 are clear, i.e. there is no flank contact. This situation is shown in FIG. 3a. After activation of the clamping force build-up device, the tie bars 4 are pulled in direction of arrow P, thereby causing the thread flanks of the thread connections 6 to contact, as shown in FIG. 3b, so that the clamping force is transmitted to the locking nuts 7. The length of engagement of the threaded connections 6 is hereby so selected that the admissible contact pressure on the thread flanks is not exceeded when subjected to the clamping force, and the thread connections 6 self-lock through suitable selection of the thread pitch and friction factor when subjected to the clamping force. Thus, the locking nuts 7 are secured against reverse rotation, and the clamping force applied onto the tie bars 4 is transmitted via the locking nuts 7 and the pertaining bearings to the moving platen 3. As a consequence of the permitted limited axial movement, the ball nut 9 is hereby protected from impacts by the applied force.

After conclusion of the injection phase, the clamping force build-up device 14 is released and the electric motor 13 re-started so that the respective contacting flanks of the thread connections 6 disengage again and the ball nut 9 as well as the moving platen 3—after the ball nut 9 impacts against the stop shoulder 10—move in opening direction. The thread connections 6 remain hereby in contactless state as a consequence of the fixed rotative linkage between the locking nuts 7 and the ball nut 9.

In order to reduce the necessary thread clearance of the thread connections 6, the ball nut 9 may be spring-biased, e.g. by disk springs (not shown), for limited movement in axial direction and connection with the moving platen 3. The preset spring tension is selected according to the stroke force necessary to close and open the moving platen 3, so that the disk springs yield only when the platen 3 subjects the ball nut 9 to a closing force which exceeds the preset spring tension.

Figure 5:
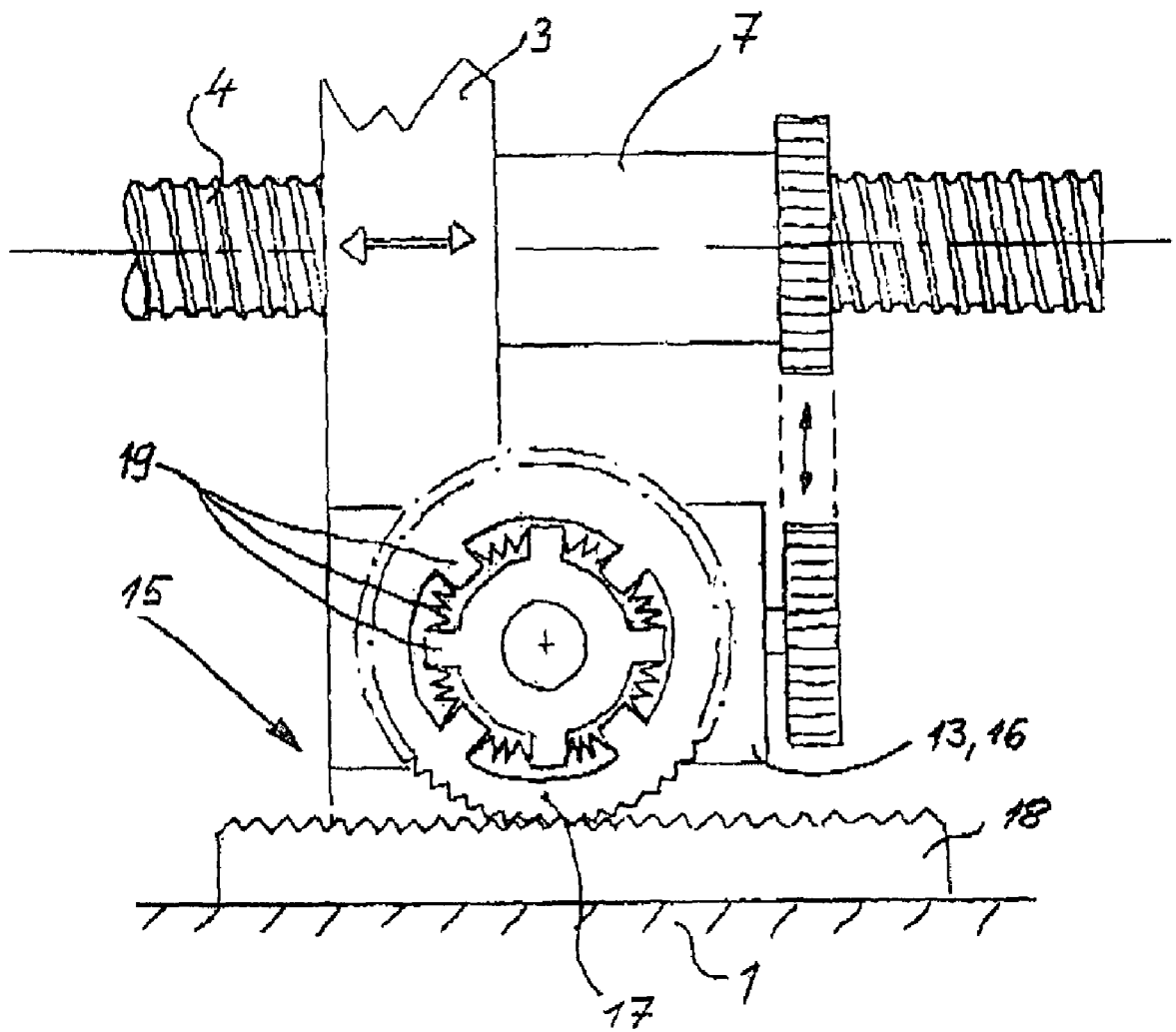
FIG. 5 is a side view of a clamping unit of an injection molding machine having incorporated therein another embodiment of a clamping mechanism including a drive unit in the form of a rack-and-pinion drive.

As an alternative to the described screw mechanism comprised of screw shaft 8 and ball nut 9, a further modification according to the present invention is shown in FIG. 5 and involves the construction of the drive unit for the moving platen 3 in the form of a rack-and-pinion drive, generally designated by reference numeral 15 and having a pinion 17, which is driven by the electric motor 13 via an angular gear 16, and a rack 18 mounted to the machine bed 1. In this case, the afore-described spring assembly is replaced by a coil spring coupling which is disposed between the angular gear 16 and pinion 17 and is torsionally yielding when subjected to a clamping force.

Of course, the platen 3 can also be moved, as an alternative to the screw mechanism 8, 9 and the electric motor 13, by a hydraulic or pneumatic piston and cylinder unit (not shown), whereby the toothed belt 12 and thus the locking nuts 7 are operated by a stroke or torque converter, which translates the linear movement of the platen 3 and may be realized by a rack mounted to the machine bed 1 and meshing with a pinion.

Figure 4A:
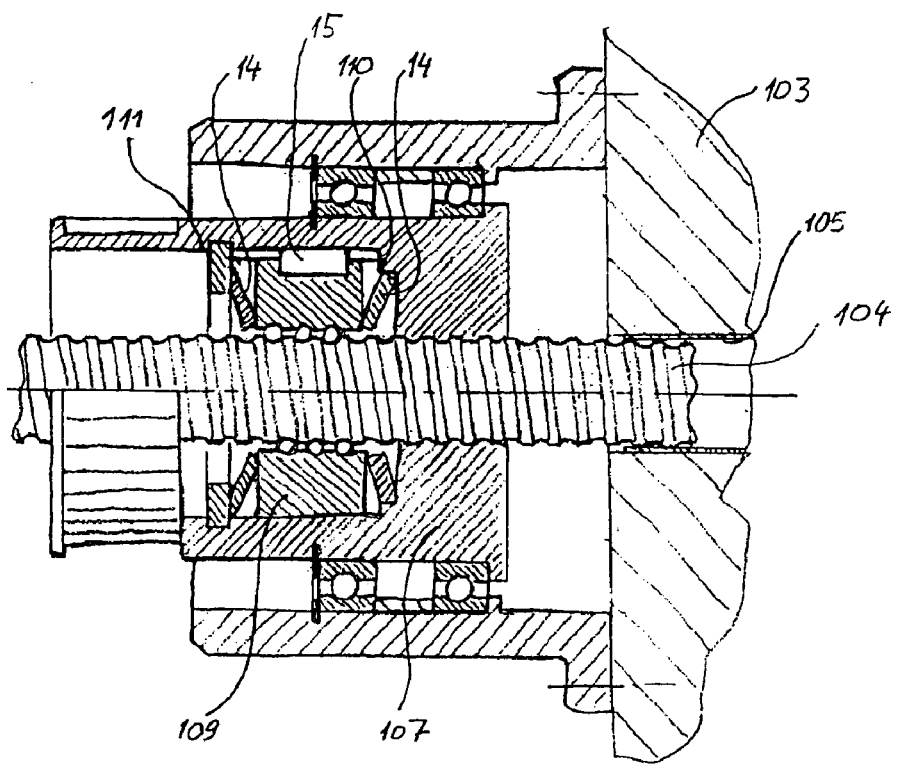
FIG. 4a is a sectional view of a combined drive and locking mechanism having incorporated therein a second embodiment of a clamping mechanism according to the present invention.

Referring now to FIG. 4a, there is shown a sectional view of a combined drive and locking mechanism having incorporated therein a second embodiment of a clamping mechanism according to the present invention. In the following description, parts corresponding with those in FIGS. 1 and 2 will be identified by corresponding reference numerals, each increased by "100". The description below will center on the differences between the embodiments. In the embodiment of FIG. 4a, provision is made for a ball nut 109 which is mounted on the same screw shaft of the tie bar 104 as the locking nut 107. In other words, the screw shaft 8, according to the embodiment of FIGS. 1 and 2 is omitted. The ball nut 109 is linked to the locking nut 107 via the disk spring assembly 14, which is under a preset spring tension, and a non-rotatable but axially moveable sliding joint, e.g. a tongue and groove joint or keying pin 15, and linked to the moving platen 103 via the locking nut 107. A synchronous operation of the locking nut 107 and ball nut 109 is again realized via a toothed belt.

Figure 4B:
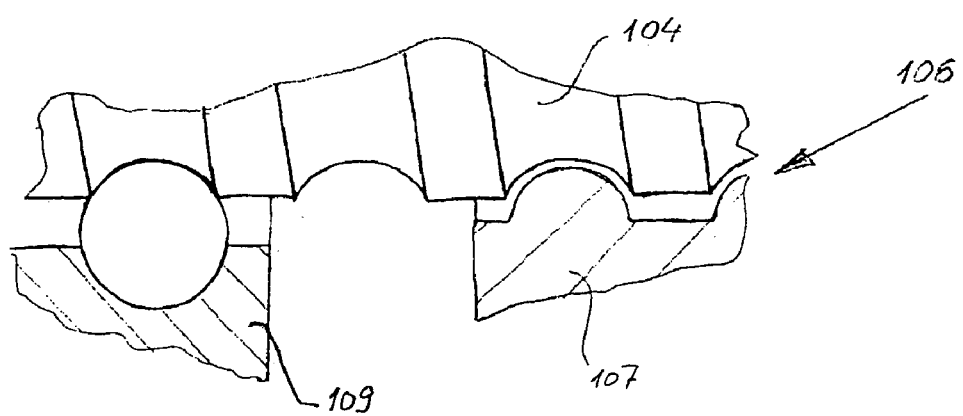
FIG. 4b is a detailed sectional view, on an enlarged scale, of the clamping mechanism of FIG. 4a in the area of the thread connection.

As shown in FIG. 4b, the screw shaft 104 has a spherical thread 106 which interacts with the ball nut 109 substantially without play. whereas the thread flanks of the locking nut 107 interact with clearance with the spherical thread 106 during opening and closing of the platen 103 and thus are also constructed part-spherical. The screw shaft 104 may, of course, also configured double-threaded, i.e. the screw shaft 104 may have a spherical thread for the ball screw 109 and a rectangular thread for the locking nut 107, which is thus configured with complementary rectangular thread profile. Operation of the this type of clamping mechanism is otherwise carried out in a same manner as the clamping mechanism of FIGS. 1 and 2 so that a further detailed description is omitted for the sake of simplicity.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A clamping mechanism for a clamping unit of an injection molding machine, comprising:
   a drive unit for moving a first platen in linear direction in relation to a fixed second platen, said drive unit being so linked to the first platen as to be able to carry out a limited movement relative to the first platen;
   a force-application unit for building up a clamping force, when the first platen assumes a closing position; and
   a locking device, disposed between the force application unit and the first platen, for transmitting the clamping force, said locking device including a screw mechanism operating in synchronism with the drive unit and having a screw shaft and a locking nut which is supported on the first platen such as to be able to rotate but being immovable in axial direction and which is constructed to connect with clearance to the screw shaft via a thread connection and to interact with the screw shaft for transmitting a load, when the clamping force is applied, whereby the threaded connection is forced to self-lock and to act free of clearance to thereby secure the locking nut on the screw shaft and prevent reverse rotation of the locking nut.

2. The clamping mechanism of claim 1, wherein the drive unit includes a spring assembly having a preset spring tension for linking the drive unit to the first platen for limited movement.

3. The clamping mechanism of claim 2, wherein the spring assembly includes a disk spring.

4. The clamping mechanism of claim 2, wherein the spring assembly of the drive unit is constructed as torsionally yielding coupling.

5. The clamping mechanism of claim 1, wherein the locking nut is rotatably driven, and the screw shaft is constrained against rotation.

6. The clamping mechanism of claim 5, wherein the screw mechanism includes a plurality of said rotatable locking nut disposed in parallel relationship, and a plurality of said non-rotatable screw shaft extending through the first platen and interacting with the locking nuts, wherein the locking nuts and the screw shafts are placed into one-to-one correspondence.

7. The clamping mechanism of claim 1, wherein the drive unit is constructed as screw mechanism.

8. The clamping mechanism of claim 7, wherein the drive unit is constructed as ball screw mechanism.

9. The clamping mechanism of claim 7, wherein the screw shaft of the screw mechanism is also part of the drive unit and cooperates substantially without clearance with a screw nut for implementing a displacement.

10. The clamping mechanism of claim 9, wherein the screw shaft is double-threaded with a first thread for the screw nut and second thread for the locking nut.

11. The clamping mechanism of claim 1, wherein the drive unit is constructed as rack-and-pinion drive.

12. The clamping mechanism of claim 1, wherein the drive unit is constructed as hydraulic drive, said screw mechanism being driven by the drive unit through intervention of a mechanical stroke or torque converter.

\* \* \* \* \*